Figures 1, 2:
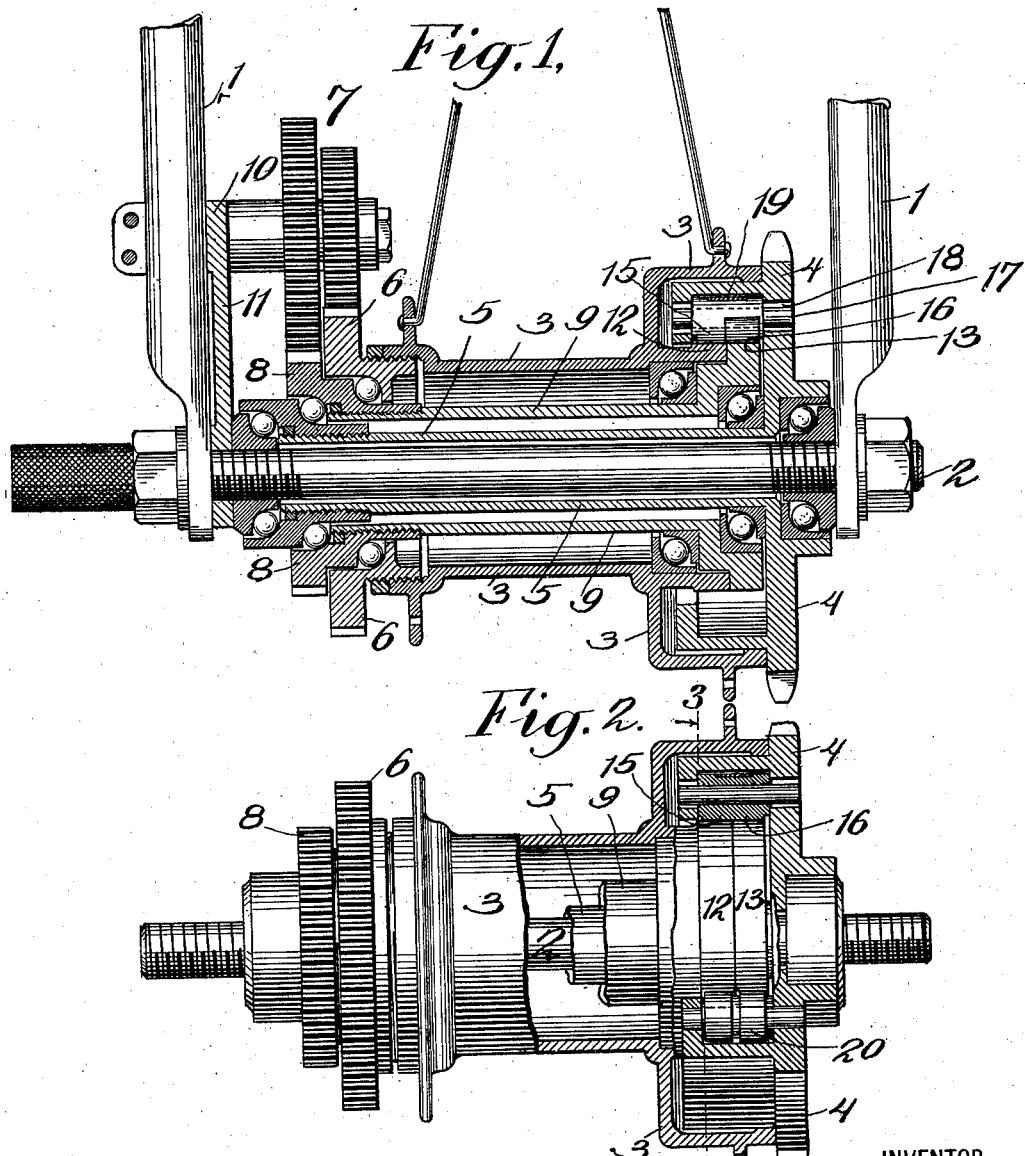

No. 712,528. Patented Nov. 4, 1902.
D. H. HAYWOOD.
MECHANICAL MOVEMENT.
(Application filed Feb. 12, 1902.)

(No Model.) 2 Sheets—Sheet 1.

WITNESSES:

INVENTOR

BY

ATTORNEYS

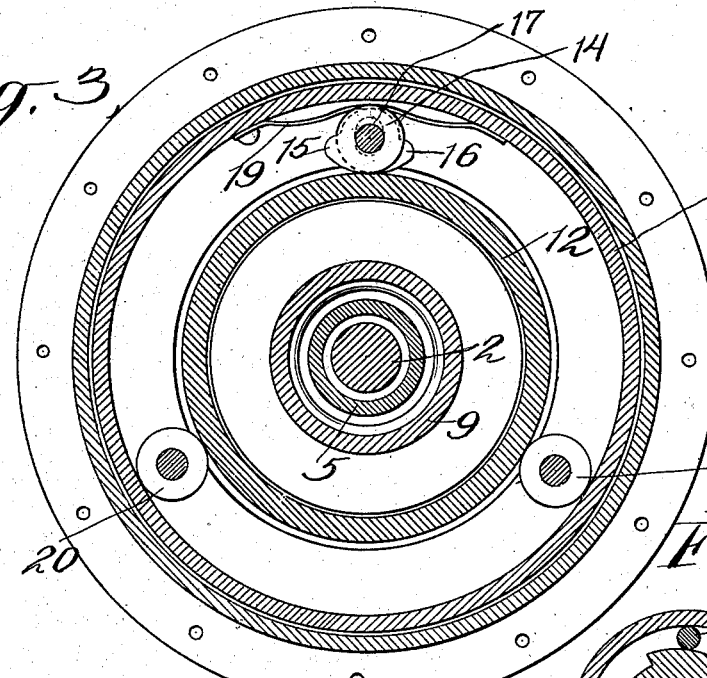

UNITED STATES PATENT OFFICE.

DANIEL HOWARD HAYWOOD, OF NEW YORK, N. Y.

MECHANICAL MOVEMENT.

SPECIFICATION forming part of Letters Patent No. 712,528, dated November 4, 1902.

Application filed February 12, 1902. Serial No. 93,676. (No model.)

*To all whom it may concern:*

Be it known that I, DANIEL HOWARD HAYWOOD, a citizen of the United States of America, and a resident of the city, county, and State of New York, have invented certain new and useful Improvements in Mechanical Movements, of which the following is a specification, reference being had to the accompanying drawings, forming a part thereof.

My invention relates to mechanical movements, and particularly to driving mechanism adapted to automatically vary the speed of drive, according to whether the driving mechanism is resisted or is overrun.

My invention is particularly adapted for use in connection with the driving mechanism of bicycles, and in the drawings forming a part of this specification I have illustrated my invention in connection with the hub of a bicycle-wheel. It will of course be understood that this is but one of the many uses of my invention and that I do not confine myself to the use of same in connection with a bicycle-wheel, as I may obviously use it for driving vehicle-wheels of other descriptions, or I may use it in connection with stationary machinery, if desired, and one form of my invention so applied is illustrated in some of the figures of the drawings herewith.

My invention comprises two members, each adapted to be alternately employed as the driving and the driven member, gearing therefor adapted to change the speed ratio between the members, and a clutch mechanism for automatically connecting the two said members to move at a different relative speed, according to which member is employed as the driving member.

The main object of my invention is to construct a driving mechanism so that it shall transmit motion at one speed when the driving stress is resisted, but that the relationship of speed between the driving and driven member shall be automatically changed when the driven member overruns the driving member.

When applied to a bicycle, a predetermined relative speed may be transmitted from the driving-sprocket to the wheel in ordinary running, while when back-pedaling the relationship of speed between the sprocket and the wheel may be increased, whereby a greater leverage is obtained and greater effective power applied to hold the bicycle back as when running downhill.

My invention further consists in certain details of construction and combination of parts to be hereinafter more fully pointed out, and other objects of my invention will appear hereinafter.

I will now proceed to describe a driving mechanism embodying my invention, and will then point out the novel features in claims.

In the drawings, Figure 1 is a view in central section through a bicycle-wheel hub, having a mechanical movement applied thereto embodying my invention. Fig. 2 is a view in partial side elevation and partial section of same. Fig. 3 is a sectional view upon the line 3 3 of Fig. 2. Fig. 4 is a view of a modified construction embodying another form of my invention. Figs. 5 and 6 are views in cross-section upon the line 5 5 6 6, respectively, of Fig. 4.

Referring first of all to Figs. 1, 2, and 3, in which the device is shown in connection with a bicycle, the rear stays are comprised in the frame of the machine are designated by the reference character 1 and the stationary rear axle by the reference character 2. 3 is the hub of the rear wheel and is normally the driven member. A sprocket-wheel 4 is shown and may be the ordinary form of rear sprocket-wheel commonly employed as a portion of the driving means. The sprocket-wheel 4 is secured to or forms a part of a sleeve 5, suitably mounted upon bearings concentrically of the stationary axle 2. The hub 3 of the wheel has rigidly secured thereto or formed as an integral part thereof a gear-wheel 6, and said gear-wheel 6 connects, through intermediate gearing 7 with a gear-wheel 8, rigidly secured to an intermediate driving member 9. The intermediate member 9 surrounds the driving member 5 and is mounted to rotate concentrically therewith. Suitable ball-bearings are shown as provided, as is common for the running-gear of bicycles. The intermediate gearing 7 is mounted upon a rigid support 10, secured upon one of the rear stays 1 of the frame of the machine and maintained in positive engagement with the gear-wheels 6 and 8 by a link 11, which connects with the stationary axle 2.

The relationship of the gearing 6, 7, and 8 is such as to impart a relatively greater speed in the same direction to the sleeve or intermediate member 9 than to the hub 3.

The sprocket 4 carries or controls a clutch mechanism adapted to connect the driving member either directly with the hub and to permit the intermediate member to run free or to connect the driving member with the hub through the intermediate member. For the purpose of coaction with a clutch controlled by the sprocket the hub 3 is provided with a ring 12, rigidly secured thereto or formed as an integral part thereof, and the intermediate member 9 with a similar ring 13, arranged in close proximity thereto. The clutch in this example of my invention comprises a roller 14, having two cam projections 15 and 16. The cam projection 15 is adapted to engage with the periphery of the ring 12, while the cam 16 is adapted to engage with the periphery of the ring 13. The roller 14 is provided with trunnions 17, mounted in slots 18 in the sprocket-body 4. A spring 19 normally tends to press the roller against the periphery of the said rings.

The operation of the device is as follows: In the forward driving of the bicycle the direction of the driving-sprocket 4 is in the direction of the arrow in Fig. 3. The tendency of the two rings 12 and 13 will be to remain stationary, due to inertia. The roller 14 being in frictional contact with the periphery of the rings 12 and 13 will cause the said roller to turn upon itself until the cam-surface 15, bearing upon the periphery of the ring 12, gradually raises the roller 14 against the tension of the spring 19 until the opposite side of the roller binds against the inner wall of the clutch-housing carried by the sprocket. The effect will be to lock the sprocket 4 to the ring 12, and hence to the hub 3, so that the members will be carried in driving connection. The sprocket and hub will now rotate in unison. The sleeve 9 will also rotate in the same direction, but at a higher speed. The roller 14 will at this time be entirely clear from the ring 13 of the said intermediate member, for the reason that the cam projection 16 will have been moved out of the way of the surface of the said ring and the roller itself lifted clear by the rolling-up action, due to the cam projection 15. If the bicycle overruns the driving mechanism and it is desired to back-pedal—as, for instance, as when going down a hill—the relationship of the driving and the driven member will be reversed. The bicycle-wheel, and hence the hub 3, will become the driving member, while the sprocket-wheel 4 will become the driven member and against which resistance will be applied. The first effect of the hub 3 overrunning the sprocket-wheel 4 will be to turn the roller 14 in the reverse direction to which it was formerly moved, as before explained, so as to release the cam projection 15 from engagement with the ring 12. As, however, the cam projection 15 leaves the surface of the ring 12 the cam projection 16 will be brought into contact with the the ring 13 and continued movement will lock the clutch-roller 14 between the sprocket-wheel and the ring 13 of the intermediate member 9, so that during back-pedaling connection will be made through the intermediate member, and by reason of the relationship of the gearing a greater leverage will be obtained at such times and greater effective power applied for holding back the wheel than if the connection were directly between the sprocket 4 and the hub 3.

It will be seen that the action of the clutch is entirely automatic and that the sprocket 4 and hub 3 will be connected together, either directly or through the intermediate member, according to whether the sprocket or the hub is at that moment the driving member. Further, by the construction of the clutch mechanism the members 3 and 4 will always be connected together directly or indirectly—that is to say, there will be no time at which the driving and driven members are entirely free of each other.

I have shown but one clutch-roller 14, and have shown plain rollers 20 and 21 at various points around the peripheries of the rings 12 and 13 in order that pressure may be centralized and that no undue stress will be permitted upon the bearings; but it is of course obvious that I may use a plurality of clutch members if I so desire.

In applying my mechanical movement to bicycles or other vehicle-wheels it is advantageous to so arrange that the wheel or normal driven member shall rotate at less relative speed with respect to the normal driving member at such times as the said wheel becomes the driving member than at such times as the wheel is being driven—this because a greater purchase may be applied to transmit power when the wheel is being driven than when it is being held back, as by back-pedaling. When, however, it is desired to use my invention in connection with certain classes of machinery, it may be advantageous to reverse such relationship of speed and to decrease the relationship of speed between the two members when overrunning rather than to increase the said speed. In Figs. 4, 5, and 6 of the drawings I have shown a construction in which the relationship of speed is so arranged. In these views the driving member 22 is secured upon a drive-shaft 23, and the normal driven member is arranged concentrically therewith and comprises a sleeve 24, having a gear-wheel 25, from which power may be taken. The intermediate member 26 is arranged concentrically of the other members and carries a gear-wheel 27. The driven member 24 carries a similar gear-wheel 28, and the gear-wheels 27 and 28 mesh with an internally-toothed gear-ring 29, mounted to rotate in stationary bearings 30. The intermediate member 26 has a movement in the same direction as the member 24, but at a relatively lower speed. Clutch-rollers 31 are arranged between the driving member 22 and the driven member 24, while clutch-rollers 32 are arranged between the driving member 22 and the intermediate member 26. The operation of construction, as shown in these figures, is as follows: When the driving member is rotated in the direction of the arrows of Figs. 5 and 6, the clutch-rollers 31 will operate to secure the driven member 24 and the driving member 22 together, while the intermediate member 26 will rotate in the same direction, but at a lower speed, thereby permitting the clutch-rollers 32 to run free. If, however, the normal driven member 24 overruns the normal driving member 22, the clutch-rollers 31 will be freed, while the clutch-rollers 32 will be engaged. The member 24 will now become the driving member, which will by the relation of gearing 27, 28, and 29 rotate at a lower relative rate of speed than the member 22.

It is obvious that many and various modifications of the specific structures herein shown and described may be resorted to within the spirit and scope of my invention, and hence I do not desire to be restricted only to the precise details of construction and combination of parts herein set forth. It is also obvious that my improved mechanical movement has a wide range of applicability, and hence I do not desire to be restricted only to its use as a bicycle driving mechanism.

What I claim is—

1. The combination with two members, each adapted to be alternately employed as the driving and the driven member, and gearing therefor, adapted to give a different relative rate of speed to the said members, of an automatic clutch mechanism for automatically connecting the two said members to move at a different relative speed, according to which member is employed as the driving member.

2. The combination with two members, each adapted to be alternately employed as the driving and the driven member, and gearing therefor, adapted to give a different relative rate of speed to the said members, of an automatic clutch mechanism for automatically connecting the two said members to move always in the same direction relatively to each other, but at a different relative speed, according to which member is employed as the driving member.

3. The combination with two members, each adapted to be alternately employed as the driving and the driven member, and gearing therefor, adapted to give a different relative rate of speed to the said members, of an automatic clutch mechanism arranged to automatically connect the two said members, either directly, or through the gearing, according to which member is employed as the driving member.

4. The combination with two members, each adapted to be alternately employed as the driving and the driven member, and gearing therefor, adapted to give a different relative rate of speed to the said members, of an automatic clutch mechanism arranged to automatically connect the two said members, either directly, or through the gearing, according to which member is employed as the driving member, said members arranged to move always in the same direction relatively of each other.

5. The combination with two members, each adapted to be alternately employed as the driving and the driven member, and an intermediate member, of gearing connecting the said intermediate member and one of the two first said members together to move at different relative speeds, and an automatic clutch mechanism for connecting the two first said members directly, or through the said intermediate member, according to which member is employed as the driving member.

6. The combination with two members, each adapted to be alternately employed as the driving and the driven member, and an intermediate member, of gearing connecting the said intermediate member and one of the two first said members together, whereby said intermediate member moves at a higher rate of speed than the member to which it is connected, and a clutch mechanism for connecting the two first said members directly, or through the said intermediate member, according to which member is employed as the driving member.

7. The combination with two members, each adapted to be alternately employed as the driving and the driven member, and an intermediate member, of gearing connecting the said intermediate member and one of the two first said members together to move at different relative speeds, and an automatic clutch mechanism for connecting the two first said members directly, or through the said intermediate member, according to which member is employed as the driving member, said members arranged to move always in the same direction relatively of each other.

8. The combination with two members, each adapted to be alternately employed as the driving and the driven member, and an intermediate member, of gearing connecting the said intermediate member and one of the two first said members together, whereby said intermediate member moves at a higher rate of speed than the member to which it is connected, and an automatic clutch mechanism for connecting the two first said members directly, or through the said intermediate member, according to which member is employed as the driving member, said members arranged to move always in the same direction relatively of each other.

9. The combination with a driving member, a driven member, and gearing therefor, adapted to give a different relative rate of speed to the said members, of an automatic clutch mechanism arranged to automatically connect the two members in driving connection at one speed, and in overrunning connection at another speed.

10. The combination with a driving member, a driven member, and gearing therefor, adapted to give a different relative rate of speed to the said members, of an automatic clutch mechanism arranged to automatically connect the two members directly, in driving connection, and through the said gearing in overrunning connection.

11. The combination with a driving member, a driven member, and gearing therefor, adapted to give a different relative rate of speed to the said members, of an automatic clutch mechanism arranged to automatically connect the two members in driving connection at one speed, and in overrunning connection at another speed, but to move always in the same direction relatively of each other.

12. The combination with a driving member, a driven member, and gearing therefor, adapted to give a different relative rate of speed to the said members, of an automatic clutch mechanism arranged to automatically connect the two members directly, in driving connection, and through the said gearing in overrunning connection, but to move always in the same direction relatively of each other.

13. The combination with a rotatable driving member, of two members mounted to rotate concentrically therewith, gearing connecting two of said members to rotate at different relative speeds, and an automatic clutch mechanism arranged to automatically connect one or other of the gear-connected members with the other said member, according to whether the said driving member is driving or being overrun.

14. The combination with a rotatable driving member, of two members mounted to rotate concentrically therewith, gearing connecting two of said members to rotate at different relative speeds in the same direction, and an automatic clutch mechanism arranged to automatically connect one or other of the gear-connected members with the other said member, according to whether the said driving member is driving or being overrun.

15. The combination with a rotatable driving member, of two members mounted to rotate concentrically therewith, gearing connecting said last two members to rotate at different relative speeds, and an automatic clutch mechanism arranged to automatically connect one or other of the gear-connected members with the other said member, according to whether the said driving member is driving or being overrun.

16. The combination with a rotatable driving member, of two members mounted to rotate concentrically therewith, gearing connecting said last two members to rotate at different relative speeds in the same direction, and an automatic clutch mechanism arranged to automatically connect one or other of the gear-connected members with the other said member, according to whether the said driving member is driving or being overrun.

17. The combination with a driving member, a driven member, and an intermediate member, all arranged to move always in the same direction with relation to each other, gearing connecting said intermediate member with one of the other said members whereby they move at different relative rates of speed, of an automatic clutch mechanism arranged to always automatically connect one or other of said gear-connected members with the other said member, whereby said driving and driven members are always connected, either directly, or indirectly.

18. The combination with a driving member, a driven member, and an intermediate member, all mounted and arranged to rotate concentrically of each other, and always in the same direction with relation to each other, gearing connecting said intermediate member with one of the other said members whereby they move at different relative rates of speed, of an automatic clutch mechanism arranged to always automatically connect one or other of said gear-connected members with the other said member, whereby said driving and driven members are always connected, either directly, or indirectly.

19. The combination with a member adapted to be normally employed as a driving member, another member adapted to be normally employed as a driven member, and an intermediate member, of gearing connecting said intermediate member and one of the two said first-named members together, to move at different relative rates of speed, and an automatic clutch mechanism for automatically connecting the two first-named members together when normally employed, or for connecting said intermediate member with the other of said two first-named members, when the relationship of driving to driven member is reversed.

20. The combination with a member adapted to be normally employed as a driving member, another member adapted to be normally employed as a driven member, and an intermediate member, of gearing connecting said intermediate member and one of the two said first-named members together, whereby said intermediate member moves at a higher rate of speed than the member to which it is so connected, and an automatic clutch mechanism for automatically connecting the two first-named members together when normally employed, or for connecting said intermediate member with the other of said two first-named members, when the relationship of driving to driven member is reversed.

21. The combination with two members adapted to be drivingly connected to move at different speeds, but always in the same direction relatively to each other, of a clutch mechanism comprising an automatic clutch for automatically connecting the two said members to move at different speeds, in accordance with the direction of driving pressure upon the said clutch.

22. The combination with two members adapted to be drivingly connected to move at different speeds, but always in the same direction relatively to each other, and gearing giving a different speed ratio, of an automatic clutch mechanism comprising a clutch for automatically connecting the two said members to move at different speeds, in accordance with the direction of driving pressure upon the said clutch.

23. The combination of two members adapted to be drivingly connected to move at different speeds, but always in the same direction relatively to each other, and alternative means in connection therewith, for transmitting motion from one member to the other at different speed ratios, said means including an automatic clutch mechanism for automatically connecting the said members at one or other of the said speed ratios in accordance with the direction of driving pressure thereon.

24. The combination with two members adapted to be drivingly connected to move at different speeds, but always in the same direction relatively to each other, and gearing, giving a different speed ratio, connected to one of said members, of an automatic clutch mechanism comprising a clutch for automatically connecting the two said members, either directly, or through said gearing, in accordance with the direction of driving pressure upon the said clutch.

25. The combination with two concentric sleeves and gearing connecting same to rotate in the same direction, but at different speeds relatively to each other, of a driving member, and an automatic clutch carried thereby, adapted to automatically engage either of said sleeves according to which direction pressure is applied to said driving member.

26. The combination with three concentric sleeves mounted to rotate about a common axis and always in the same direction relatively to each other, one of said sleeves comprising a driving member, of gearing connecting two of the said sleeves together to rotate at different rates of speed, and a clutch automatically operated by pressure applied to the driving member in one direction of rotation, or the other to connect one or other of the two said gear-connected sleeves to the third said sleeve, according to which direction the said pressure is applied.

27. The combination with three concentric sleeves mounted to rotate about a common axis and always in the same direction relatively to each other, one of said sleeves comprising a driving member, of gearing connecting two of the said sleeves together to rotate at different rates of speed, and a clutch carried by said driving member, and automatically operated by pressure applied to the driving member in one direction of rotation, or the other to connect one or other of the two said gear-connected sleeves to the third said sleeve, according to which direction the said pressure is applied.

28. The combination with two concentric sleeves and gearing connecting same to rotate in the same direction, but at different speeds relatively to each other, of a clutch having two projections, one adapted to engage one said sleeve and the other to engage the other said sleeve, said clutch adapted, when moved in either direction, to operatively engage one or other of said sleeves and to be moved entirely out of engagement and contact with the sleeve which at such time it does not operatively engage.

29. The combination with two concentric sleeves and gearing connecting same to rotate in the same direction, but at different speeds relatively to each other, of a driving member, and a clutch carried thereby having two projections, one adapted to engage one said sleeve and the other to engage the other said sleeve, said clutch adapted, when moved in either direction, to operatively engage one or other of said sleeves and to be moved entirely out of engagement and contact with the sleeve which at such time it does not operatively engage.

30. The combination with three concentric sleeves mounted to rotate about a common axis and always in the same direction relatively to each other, one of said sleeves comprising a driving member, of gearing connecting two of the said sleeves together to rotate at different rates of speed, and a clutch having two projections, each adapted to operatively connect one or other of the two said gear-connected sleeves with the third said sleeve, said clutch operated by pressure applied to the driving member in one direction of rotation for making one said connection, and in the other direction for making the other said connection.

31. The combination with three concentric sleeves mounted to rotate about a common axis and always in the same direction relatively to each other, one of said sleeves comprising a driving member, of gearing connecting the other two said sleeves together to rotate at different rates of speed, and a clutch carried by the driving member, and arranged to automatically connect said driving member with one or other of the said sleeves according to in which direction of rotation pressure is applied to said driving member.

32. In a bicycle, the combination with a wheel-hub comprising a sleeve, of two sleeves mounted to rotate concentrically therewith, gearing connecting two of the said sleeves together to rotate at different relative rates of speed, and a clutch for automatically connecting one or the other of the two said gear-connected sleeves with the other said sleeve, in accordance with the direction of driving pressure upon the said clutch.

33. In a bicycle, the combination with a wheel-hub, two sleeves mounted to rotate concentrically therewith, and gearing connecting one of said sleeves and said hub together to rotate at different relative rates of speed, of a clutch for automatically connecting one or the other of said sleeves with the said hub, in accordance with the direction of driving pressure upon the said clutch.

34. In a bicycle, the combination with a wheel-hub, two sleeves mounted to rotate concentrically therewith, and gearing connecting one of said sleeves and said hub together so that the said sleeve will rotate in the same direction as the said hub, but at a higher relative rate of speed, of a clutch for automatically connecting one or other of said sleeves with the said hub, in accordance with the direction of driving pressure upon the said clutch.

35. In a bicycle, the combination with a wheel-hub, a driving member mounted to rotate concentrically therewith, an intermediate sleeve mounted to rotate concentrically with the said driving member and hub, and gearing connecting said intermediate sleeve and said hub to rotate together so that the said intermediate sleeve will rotate in the same direction as the said hub, but at a higher relative rate of speed, of a clutch for automatically connecting the said driving member with the said intermediate sleeve, or directly with the said hub, in accordance with the direction of driving pressure upon the said clutch.

36. In a bicycle, the combination with a wheel-hub, a driving member mounted to rotate concentrically therewith, an intermediate sleeve mounted to rotate concentrically with the said driving member and hub, and gearing connecting said intermediate sleeve and said hub to rotate together so that the said intermediate sleeve will rotate in the same direction as the said hub, but at a higher relative rate of speed, of a clutch carried by the said driving member for automatically connecting the said driving member with the said intermediate sleeve or directly with the said hub, in accordance with the direction of driving pressure upon the said driving member.

DANIEL HOWARD HAYWOOD.

Witnesses:
M. M. CONOVER,
A. H. PERLES.